UNITED STATES PATENT OFFICE.

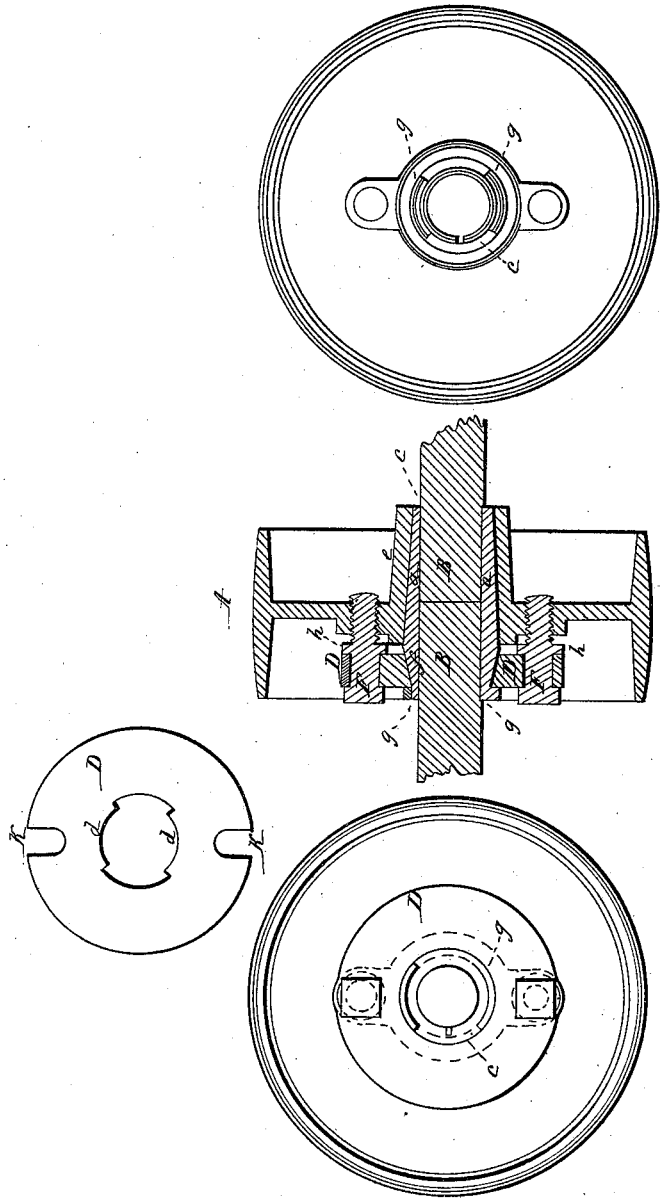
P. Teal,
Shaft Coupling,
Nº 15,351. Patented July 15, 1856.

PETER TEAL, OF PHILADELPHIA, PENNSYLVANIA.

DETACHABLE SHAFT-COUPLING.

Specification of Letters Patent No. 15,351, dated July 15, 1856.

*To all whom it may concern:*

Be it known that I, PETER TEAL, of the city and county of Philadelphia and State of Pennsylvania, have invented a new and useful Improvement in Shaft-Couplings; and I do hereby declare that the following is a full, clear, and exact description of the same, reference being had to the accompanying drawings, making a part of this specification.

By my improvement in shaft couplings I am enabled not only to couple line shafting in a superior manner, but with the use of the same devices by reversing the turning of the screws thus perform the new function of uncoupling and releasing both shafts by the withdrawal of the coupling sleeve. This feature is important when long lines of shafting are employed, wherein it may be necessary to detach either or both ends entirely from the coupler, as for instance in putting on or taking off a pulley or pulleys, the removal of the coupler from the shafts being effected without the necessity of driving out the cone sleeve from the hub of the coupler, by hammer or other violent means.

To enable others skilled in the art to construct and use my improved coupler the following is a description thereof.

A, represents the coupler, which serves admirably as a pulley; B B, the shafts, their ends joining in the center of the coupler.

C, is a split sleeve formed of a double cone, with their bases in conjunction. The longer cone (*a*) enters a conical cavity in the hub (*e*) of the coupler, while the short end quick cone (*f*) projects beyond the face of the hub. This end of the sleeve is provided with flanges (*g g*) on opposite sides of the cone sleeve (whose function will be hereinafter explained).

D is a perfect ring which I term a pressure plate, formed with a conical opening to fit on the cone (*f*) of the sleeve. There are projections (*d, d*) formed at the opening of D, that may be turned under the projections (*g, g*) of the sleeve C, and it is by these projections being thus turned under each other that the cone may be withdrawn without violence.

F F are necked screws, that is screws with a collar (*h*) on them, so situated that the plate D shall be embraced between the collar and head of the screw.

*k, k*, are slots in D for the side introduction of the screws aforesaid, those screws are tapped in the plate of the coupler.

The operation in coupling is as follows: The screws F, F, being turned take in their tap in the coupler plate, and draw the pressure plate or ring D upon the cone, *f*, and force the sleeve into the cavity of the hub, thus causing the contraction of the slit sleeve and the binding upon the ends of the shafts introduced into the body of the hub, thereby sustaining the ends of the shaft more perfectly, by clamping in the body of the hub of the coupler, the sleeve materially assisted in so doing by the periphery of the pulley.

To uncouple the shafts and detach the sleeve, so that the coupler may be slid on either shaft, it is only necessary to reverse the movement of the screws F F, or back them, when the collars thereof will lift the plate D, and by the lugs or projections (*g, g*) of the sleeve, it will be withdrawn without the necessity existing in other cases of using a hammer or sledge for the removal of the sleeve, thus avoiding the disfigurement of a neatly finished coupler.

I do not claim the split sleeve for coupling shafts, whether constructed with single or double conical surfaces as that is well known, but What I do claim as my invention and desire to secure by Letters Patent is—

The plate or ring D constructed and arranged as above described, for the double purpose of operating the coupling of the shafts and also for releasing the coupling.

In testimony whereof I have hereunto signed my name before two subscribing witnesses.

PETER TEAL.

Witnesses:
WM. S. CLARK,
JOHN S. HOLLINGSHEAD.